United States Patent [19]

Mallozzi et al.

[11] 4,002,403
[45] Jan. 11, 1977

[54] SUPPRESSING SUPERRADIANCE

[75] Inventors: Philip J. Mallozzi; Harold M. Epstein; David C. Applebaum, all of Columbus; William J. Gallagher, Worthington; Bernerd E. Campbell, Columbus, all of Ohio

[73] Assignee: Battelle Memorial Institute, Columbus, Ohio

[22] Filed: Oct. 11, 1973

[21] Appl. No.: 405,444

[52] U.S. Cl. .......................... 350/160 R; 332/7.51; 350/299; 350/161 R
[51] Int. Cl.² .......................................... G02B 5/23
[58] Field of Search ............. 356/119; 331/94.5 A; 332/7.51; 350/160 R, 161

[56] References Cited

UNITED STATES PATENTS

| | | | |
|---|---|---|---|
| 3,213,752 | 10/1965 | Ruderman | 350/160 |
| 3,376,089 | 4/1968 | Letter | 359/160 |
| 3,415,591 | 12/1968 | Letter | 350/161 |
| 3,455,627 | 7/1969 | Letter | 331/94.5 A |

OTHER PUBLICATIONS

Mallozzi et al., "X-ray Emission from Laser Generated Plasmas", 2/29/72, pp. 4–14, Final Report, vol. 2, Battella Col. Labs., G-222.
Mallozzi et al., "X-ray Emission From Laser Generated Generated Plasmas", 5/11/72, Invited Paper to VII International Quantum Electronics Conference, Montreal, Canada.

*Primary Examiner*—Nelson Moskowitz
*Attorney, Agent, or Firm*—Philip M. Dunson

[57] ABSTRACT

Methods and apparatus for directing a radiation pulse from a laser to a target or other selected location and preventing undesired earlier radiation from the laser having less than a selected intensity from reaching the selected location.

A beam splitter directs a major portion of the radiation pulse energy along a longer main path to a predetermined region and continuing on toward the selected location, and directs a minor portion along a shorter secondary path to the predetermined region. A reflective surface on a transparent support in the predetermined region prevents energy having less than the selected intensity from continuing on toward the selected location. The surface comprises a thin layer, as of aluminum, that remains substantially unimpaired until it is subjected to radiation having at least the selected itensity, and then is substantially removed in the area impinged by such radiation, so that when the minor portion of the radiation pulse energy along the shorter secondary path has at least the selected intensity, and thus substantially removes the impinged area of the reflective layer, the major portion of the radiation pulse reaching the predetermined region thereafter can continue on through the area of removal toward the selected location.

Alternatively, the minor energy portion actuates an electrical discharge to vaporize the reflective layer at least substantially.

24 Claims, 2 Drawing Figures

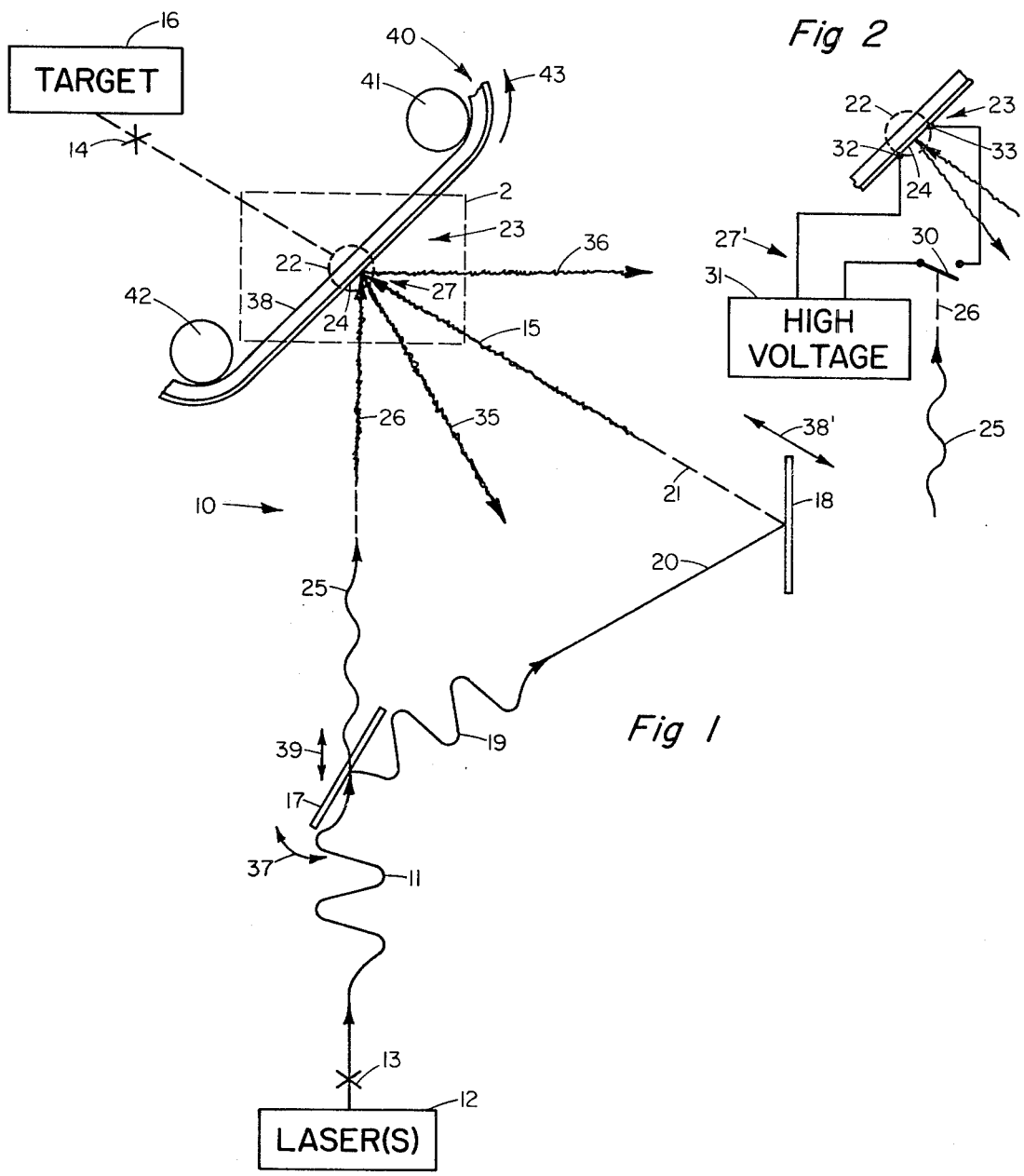

SUPPRESSING SUPERRADIANCE

BACKGROUND

A problem in laser-generated plasma research with large Q-switched lasers is premature disruption of targets by the long amplified spontaneous (i.e., "superradiance") prepulse that is delivered to the target before the arrival of the main pulse. A typical multistage neodymium-doped glass laser operating in the 100 joule per nanosecond mode emits a 1-joule superradiance precursor over about $10^{-4}$ seconds. This is sufficient to destroy many experiments. For example, most targets designed to be heated to the several keV temperature regime upon absorption of the 100 joule main pulse will be vaporized and dispersed from the focal volume if struck by as little as about 0.01 joule of superradiance.

The superradiance could be suppressed by introducing a Kerr or Pockels cell shutter after or before the last stage. The shutter would block the superradiance but be switched on just before the main pulse arrives. Unfortunately, the construction of sufficiently large Kerr or Pockels cells is difficult and expensive, and for the case of large aperture disk lasers is totally impractical.

Methods and apparatus according to the present invention are advantageous for suppressing undesired precursors in high power Q-switched lasers of any aperture and in various other radiation sources.

SUMMARY OF THE INVENTION

A typical method according to the present invention for directing a radiation pulse from a source to a selected location, and preventing undesired earlier radiation from the source having less than a selected intensity from reaching the selected location, comprises directing a major portion of the radiation pulse energy along a main path to a predetermined region and continuing on toward the selected location, positioning a reflective surface comprising a thin reflective layer in the predetermined region to prevent energy impinging thereon from continuing on toward the selected location, directing a minor portion of the radiation pulse energy along a secondary path, and using the energy of the minor portion to actuate a substantial removal of the reflective layer in the predetermined region when the minor portion has the selected intensity and before the corresponding major portion of the radiation pulse reaches the predetermined region, so that when the minor portion of the radiation pulse energy along the secondary path has at least the selected intensity, and thus causes the reflective layer to be substantially removed, the major portion of the radiation pulse reaching the predetermined region thereafter can continue on through the region toward the selected location. Typically the minor portion of the pulse energy is about 10 to 40 percent of the total radiation pulse energy.

The method may include the further step of moving the reflective surface afterward to locate an intact area thereof at the predetermined region, and then repeating the other steps.

In one typical use of the method, the minor energy portion actuates an electrical discharge to vaporize the reflective layer at least substantially. In another, the minor energy portion is directed along the secondary path to reach the predetermined region before the corresponding major portion of the radiation pulse reaches it, and the thin reflective layer comprises a material that remains substantially unimpaired until it is subjected to radiation having at least the selected intensity, and then is substantially removed in the area impinged by such radiation.

A typical preferred form of the present method of directing a radiation pulse from a source to a selected location, and preventing undesired earlier radiation from the source having less than a selected intensity from reaching the selected location, comprises directing a major portion of the radiation pulse energy along a longer main path to a predetermined region and continuing on toward the selected location, directing a minor portion of the radiation pulse energy along a shorter secondary path to the predetermined region, and positioning a reflective surface in the predetermined region to prevent energy having less than the selected intensity from continuing on toward the selected location, the surface comprising a thin reflective layer that remains substantially unimpaired until it is subjected to radiation having at least the selected intensity, and then is substantially removed in the area impinged by such radiation, so that when the minor portion of the radiation pulse energy along the shorter secondary path has at least the selected intensity, and thus substantially removes the impinged area of the reflective layer, the major portion of the radiation pulse reaching the predetermined region thereafter can continue on through the area of removal toward the selected location.

Typical apparatus according to the invention for directing a radiation pulse from a source therein to a selected location therein, and preventing undesired earlier radiation from the source having less than a selected intensity from reaching the selected location, includes the improvement comprising means for directing a major portion of the radiation pulse energy along a main path to a predetermined region and continuing on toward the selected location, reflective surface means comprising a thin reflective layer in the predetermined region to prevent energy impinging thereon from continuing on toward the selected location, means for directing a minor portion of the radiation pulse energy along a secondary path, and means in the secondary path responsive to radiation having at least the selected intensity for substantially removing the reflective layer in the predetermined region, so that when the minor portion of the radiation pulse energy along the secondary path has at least the selected intensity, and thus causes the reflective layer to be substantially removed, the major portion of the radiation pulse reaching the predetermined region thereafter can continue on through the region toward the selected location. The layer removing means is positioned to receive the minor portion of the radiation pulse and to substantially remove the reflective layer in response to the selected intensity thereof before the corresponding major portion of the radiation pulse reaches the predetermined region.

In one typical form of the apparatus, the layer removing means provides an electrical discharge to the reflective layer to vaporize it at least substantially.

A typical preferred form of the present apparatus for directing a radiation pulse from a source therein to a selected location therein, and preventing undesired earlier radiation from the source having less than a selected intensity from reaching the selected location, includes the improvement comprising means for directing a major portion of the radiation pulse energy along a longer main path to a predetermined region and continuing on toward the selected location, means for directing a minor portion of the radiation pulse energy along a shorter secondary path to the predetermined region, and reflective surface means in the predetermined region to prevent energy having less than the selected intensity from continuing on toward the selected location, the surface means comprising a thin reflective layer that remains substantially unimpaired until it is subjected to radiation having at least the selected intensity, and then is substantially removed in the area impinged by such radiation, so that when the minor portion of the radiation pulse energy along the shorter secondary path has at least the selected intensity, and thus substantially removes the impinged area of the reflective layer, the major portion of the radiation pulse reaching the predetermined region thereafter can continue on through the area of removal toward the selected location.

The reflective surface means preferably is positioned so as to reflect the undesired earlier radiation in a direction that avoids contact with any portion of the apparatus that might be adversely affected by such radiation. Typically the reflective surface means is positioned at an angle of about 2° to 30° from a plane normal to the main path at the predetermined region.

Typically, the reflective layer comprises essentially aluminum, gold, silver, copper, or lead, about 100 to 1000 angstroms thick; typically comprising a coating on a transparent support that comprises essentially glass, quartz, polyethylene terephthalate, or other transparent plastic, and that preferably is less than about 10 wavelengths thick.

Typically the radiation source is a neodymium laser, the reflective layer comprises a coating consisting essentially of aluminum about 100 to 1000 angstroms thick on a polyethylene terephthalate support, and the selected intensity is about 0.2 to 2 joules per square centimeter.

The radiation source typically comprises a laser that may emit other radiation before a stimulated emission pulse, and the means for directing the major and minor portions of the radiation pulse energy comprises a beam splitter, with means for moving the beam splitter to control the ratio of the major portion to the minor portion of the energy. Typically the beam splitter is adjusted to direct about 10 to 40 percent of the energy along the shorter path and the balance along the longer path.

Typically at least one reflector is included in the longer path, with means for adjusting the length of the longer path comprising a reflector in the longer path and means for controlling its position.

BRIEF DESCRIPTION OF THE DRAWINGS

FIG. 1 is a schematic view illustrating typical embodiments of the present invention.

FIG. 2 is a schematic view of an alternative form of the portion of the apparatus in the rectangle 2 in FIG. 1.

DESCRIPTION OF PREFERRED EMBODIMENTS

FIG. 1 schematically illustrates typical apparatus 10 according to the present invention for directing a radiation pulse 11, from a source 12 therein, such as a laser oscillator or a laser oscillator followed by any desired number of laser amplifiers, as indicated generally at 13, to a selected location 14 therein and preventing undesired earlier radiation, as at 15, from the source 12 having less than a selected intensity from reaching the selected location 14. The selected location 14 typically comprises an input location of apparatus such as any desired number of laser amplifiers and any associated apparatus such as the backscatter isolation apparatus of United States patent application Ser. No. 246,161, filed Apr. 21, 1972, of Philip J. Mallozzi et al.; now U.S. Pat. No. 3,778,585 issued Dec. 11, 1973; from which the amplified radiation pulse is directed to a target 16. Or, if desired, the target 16 itself may be placed at the selected location 14.

An important feature of the apparatus 10 is the improvement comprising means, such as a beam splitter 17 and a reflector 18, for directing a major portion 19 of the radiation pulse energy 11 along a main path 19, 20, 21 to a predetermined region 22 and continuing on toward the selected location 14; reflective surface means 23 comprising a thin reflective layer 24 in the predetermined region 22 to prevent energy (as 15) impinging thereon from continuing on toward the selected location 14; means, such as the beam splitter 17, for directing a minor portion 25 of the radiation pulse energy 11 along a secondary path 25, 26; and means 27 or 27' in the secondary path responsive to radiation having at least the selected intensity for substantially removing the reflective layer 24 in the predetermined region 22, so that when the minor portion 25 of the radiation pulse energy along the secondary path 25, 26 has at least the selected intensity, and thus causes the reflective layer 24 to be substantially removed, the major portion 19 of the radiation pulse 11 reaching the predetermined region 22 thereafter can continue on through the region 22 toward the selected location 14.

The layer removing means 27 may comprise simply the material in the layer 24 itself, having such thickness and such physical characteristics as to be substantially removed where subjected to radiation having at least the selected intensity. Another type of layer removing means 27' is shown in FIG. 2, which illustrates schematically an alternative form of the portion of the apparatus 10 that is enclosed in the rectangle 2 in FIG. 1.

In FIG. 2 the layer removing means 27' comprises normally open switching means 30 such as a photoelectric cell or other suitable electronic or electromechanical means responsive to the minor portion 25 of the radiation pulse energy when it has at least the selected intensity, but not when it has less than the selected intensity, to complete the circuit between a high voltage source 31 and the portion of the reflective layer 24 in the predetermined region 22 between the contacts 32 and 33. Thus the layer removing means 27' provides an electrical discharge to the reflective layer 24 to vaporize it at least substantially between the contacts 32 and 33.

The layer removing means 27 or 27' of course is positioned to receive the minor portion 25 of the radiation pulse 11 and to substantially remove the reflective layer 24 in response to the selected intensity thereof before the corresponding major portion 19 of the radiation pulse 11 reaches the predetermined region 22.

In further detail, the apparatus 10 in FIG. 1 for directing a radiation pulse 11 from a source 12 therein to a selected location 14 therein and preventing undesired earlier radiation, as at 15, from the source 12 having less than a selected intensity from reaching the selected location 14 includes the improvement comprising means, such as a beam splitter 17 and a reflector 18, for directing a major portion 19 of the radiation pulse energy 11 along a longer main path 19, 20, 21 to a predetermined region 22 and continuing on toward the selected location 14; means, such as the beam splitter 17, for directing a minor portion 25 of the radiation pulse energy 11 along a shorter secondary path 25, 26 to the predetermined region 22; and reflective surface means 23 in the predetermined region 22 to prevent energy (as 15) having less than the selected intensity from continuing on toward the selected location 14, the surface means 23 comprising a thin reflective layer 24 that remains substantially unimpaired until it is subjected to radiation (as 25) having at least the selected intensity, and then is substantially removed in the area 22 impinged by such radiation, so that when the minor portion 25 of the radiation pulse energy 11 along the shorter secondary path 25, 26 has at least the selected intensity, and thus substantially removes the impinged area 22 of the reflective layer 24, the major portion 19 of the radiation pulse 11 reaching the predetermined region 22 thereafter can continue on through the area of removal 22 toward the selected location 14.

The reflective surface means 23 preferably is positioned, as shown in FIG. 1, so as to reflect the undesired earlier radiation 15, 26 in a direction 35, 36 that avoids contact with any portion of the apparatus 10, especially the optical portions, that might be adversely affected by such radiation. Typically the reflective surface means 23 is positioned at an angle of about 2° to 30° from a plane normal to the main path 21, 15 at the predetermined region 22.

Typically the reflective layer 24 comprises essentially aluminum, gold, silver, copper, or lead, about 100 to 1000 angstroms thick; typically comprising a coating 24 on a transparent support 38 that comprises essentially glass, quartz, polyethylene terephthalate, or other transparent plastic, and that preferably is less than about 10 wavelengths thick so that it will not distort, disperse, or otherwise adversely affect the major portion 19 of the radiation pulse 11 or its path to the selected location 14.

Typically the radiation source 12 is a neodymium laser, the reflective layer 24 comprises a coating consisting essentially of aluminum about 100 to 1000 angstroms thick on a polyethylene terephthalate support 38, and the selected intensity is about 0.2 to 2 joules per square centimeter.

The radiation source 12 typically comprises a laser that may emit other radiation (prelasing radiation) before a stimulated emission pulse 11. Typically the means for directing the major portion 19 and the minor portion 25 of the radiation pulse energy 11 comprises a beam splitter 17, with means, as indicated by the arrow 37, for moving the beam splitter 17 to control the ratio of the major portion 19 to the minor portion 25 of the energy 11. Typically the beam splitter 17 is adjusted, as indicated at 37, to direct about 10 to 40 percent of the energy 11 along the shorter path 25, 26 and the balance along the longer path 19, 20, 21, 15.

Typically at least one reflector 18 is included in the longer path 19, 20, 21, 15, with means for adjusting the length of the longer path comprising a reflector 18 in the longer path and means for controlling its position as indicated by the arrow 38'. In an arrangement as shown in FIG. 1 the position of the beam splitter would also be controlled, as indicated by the arrow 39.

A typical method of using apparatus 10 as in FIGS. 1 and 2, for directing a radiation pulse 11 from a source 12 to a selected location 14 and preventing undesired earlier radiation, as at 15, from the source 12 having less than a selected intensity from reaching the selected location 14, comprises directing a major portion 19 of the radiation pulse energy 11 along a main path 19, 20, 21 to a predetermined region 22 and continuing on toward the selected location 14; positioning a reflective surface 23 comprising a thin reflective layer 24 in the predetermined region 22 to prevent energy (as 15) impinging thereon from continuing on toward the selected location 14; directing a minor portion 25 of the radiation pulse energy 11 along a secondary path 25, 26; and using the energy of the minor portion 25 to actuate a substantial removal of the reflective layer 24 in the predetermined region 22 when the minor portion 25 has the selected intensity and before the corresponding major portion 19 of the radiation pulse 11 reaches the predetermined region 22, so that when the minor portion 25 of the radiation pulse energy 11 along the secondary path 25, 26 has at least the selected intensity, and thus causes the reflective layer 24 to be substantially removed, the major portion 19 of the radiation pulse 11 reaching the predetermined region 22 thereafter can continue on through the region 22 toward the selected location 14. Typically the minor portion 25 of the pulse energy 11 is about 10 to 40 percent of the total radiation pulse energy 11.

The method may conveniently include the further step of moving the reflective surface 23 afterward to locate an intact area thereof at the predetermined region 22, and then repeating the other steps. The reflective surface 23 may be moved in any convenient manner. In FIG. 1, the transparent support 38 and reflective coating 24 thereon comprise a long strip 40, which may be wound on reels (not shown), that may be moved over a pair of rollers 41 and 42, as indicated by the arrow 43, to locate an intact area of the reflective surface 23 at the predetermined region 22 after the area already there has been substantially removed.

When the layer removing means 27' of FIG. 2 is used, the minor energy portion 25 actuates an electrical discharge between the contacts 32 and 33 to vaporize the reflective layer 24 at least substantially in the predetermined region 22. When an electrical discharge is not used, the minor energy portion 25 is directed along the secondary path 25, 26 to reach the predetermined region 22 before the corresponding major portion 19 of the radiation pulse 11 reaches it, and the thin reflective layer 24 comprises a material that remains substantially unimpaired until it is subjected to radiation having at least the selected intensity, and then is substantially removed in the area 22 impinged by such radiation.

In further detail, such a method of directing a radiation pulse 11 from a source 12 to a selected location 14, and preventing undesired earlier radiation, as at 15, from the source 12 having less than a selected intensity from reaching the selected location 14, comprises directing a major portion 19 of the radiation pulse energy 11 along a longer main path 19, 20, 21 to a predetermined region 22 and continuing on toward the selected location 14; directing a minor portion 25 of the radiation pulse energy 11 along a shorter secondary path 25, 26 to the predetermined region 22; and positioning a reflective surface 23 in the predetermined region 22 to prevent energy having less than the selected intensity from continuing on toward the selected location 14, the surface 23 comprising a thin reflective layer 24 that remains substantially unimpaired until it is subjected to radiation (as 25) having at least the selected intensity, and then is substantially removed in the area 22 impinged by such radiation, so that when the minor portion 25 of the radiation pulse energy 11 along the shorter secondary path 25, 26 has at least the selected intensity, and thus substantially removes the impinged area 22 of the reflective layer 24, the major portion 19 of the radiation pulse 11 reaching the predetermined region 22 thereafter can continue on through the area of removal 22 toward the selected location 14.

A typical superradiance suppressor 10 according to this invention was tested with 1.5 nanosecond pulses from a seven stage glass laser 12. The special two-layer film, comprising about 250 angstroms of aluminum 24 deposited on a 0.5 mil substrate 38 of polyethylene terephthalate, transmits only about 2.5 percent of the incident light 19 when intact. The beamsplitter 17 is positioned so that about 20 percent of the incident light 11 is transmitted and about 80 percent is reflected. The delay time between the transmitted pulse (prepulse) 25 and the reflected pulse (delayed pulse) 19 is about 20 nanoseconds. More than half of the delayed pulse 19 survives the passage through the vaporized aluminum at 22, so that the overall device 10 attenuates the incident pulse only by about 50 percent. Thus, the performance is comparable to that of a large Kerr or Pockels cell.

Comparison tests were performed using the same apparatus, but without the beamsplitter 17 and with the entire pulse energy 11 directed along the path 21,15. Only about 20 percent of the pulse energy reaches the selected location 14 as compared to the approximately 50 percent that reaches it through the apparatus as in FIG. 1. The enhanced transmission obtained with the present invention results from the fact that a vaporizing prepulse 25 is introduced, with a delay time between pulses selected to be sufficiently long to render the aluminum layer 24 substantially transparent to the delayed pulse 19, but sufficiently short that most of the superradiance pulse 15 is still clipped. Thus it is seen that the present invention provides substantially superior results with short pulses than can be provided with the apparatus used in the comparison tests and is much more versatile than such apparatus or similar types such as those used in the investigations reported by M. P. Vanyukov, V. I. Isaenko, P. P. Pashinin, V. A. Serebryakov, V. N. Sizov, and A. D. Starikov, "Formation of High-Power Pulses with Steep Leading Edges in a Laser System with Passive Linear Elements", Soviet Journal of Quantum Electronics, Volume 1, No. 1, pages 23–27, July-August, 1971; and by W. I. Linlor, "Laser Beam Switching by Foils", Paper 3D3, pages 999–1000, Bulletin of the American Physical Society, November, 1972.

The 0.5 mil substrate of polyethylene terephthalate provides a convenient and inexpensive transparent mounting for the aluminum stopping layer. The material is commercially available at a few cents per square feet, complete with aluminum overlay, and is similar to the material commonly used for printing in silver on greeting cards. Its thickness is only five times greater than the wavelength of neodymium laser light, so the few percent variation in thickness generated during manufacture makes it quite acceptable optically, even when slightly wrinkled.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of directing a radiation pulse from a source to a selected location and preventing undesired earlier radiation from the source having less than a selected intensity from reaching the selected location, comprising
    directing a major portion of the radiation pulse energy along a main path to a predetermined region and continuing on toward the selected location,
    positioning a reflective surface comprising a thin reflective layer in the predetermined region to prevent energy impinging thereon from continuing on toward the selected location,
    directing a minor portion of the radiation pulse energy along a secondary path, and
    using the energy of the minor portion to actuate a substantial removal of the reflective layer in the predetermined region when the minor portion has the selected intensity and before the corresponding major portion of the radiation pulse reaches the predetermined region, so that when the minor portion of the radiation pulse energy along the secondary path has at least the selected intensity, and thus causes the reflective layer to be substantially removed, the major portion of the radiation pulse reaching the predetermined region thereafter can continue on through the region toward the selected location.

2. A method as in claim 1, wherein the minor portion of the pulse energy is about 10 to 40 percent of the total radiation pulse energy.

3. A method as in claim 1, comprising the further step of moving the reflective surface afterward to locate an intact area thereof at the predetermined region, and then repeating the other steps.

4. A method as in claim 1, wherein the minor energy portion actuates an electrical discharge to vaporize the reflective layer at least substantially.

5. A method as in claim 1, wherein the minor energy portion is directed along the secondary path to reach the predetermined region before the corresponding major portion of the radiation pulse reaches it, and the thin reflective layer comprises a material that remains substantially unimpaired until it is subjected to radiation having at least the selected intensity, and then is substantially removed in the area impinged by such radiation.

6. A method of directing a radiation pulse from a source to a selected location and preventing undesired earlier radiation from the source having less than a selected intensity from reaching the selected location, comprising
    directing a major portion of the radiation pulse energy along a longer main path to a predetermined region and continuing on toward the selected location,
    directing a minor portion of the radiation pulse energy along a shorter secondary path to the predetermined region, and
    positioning a reflective surface in the predetermined region to prevent energy having less than the selected intensity from continuing on toward the selected location, the surface comprising a thin reflective layer that remains substantially unimpaired until it is subjected to radiation having at least the selected intensity, and then is substantially removed in the area impinged by such radiation, so that when the minor portion of the radiation pulse energy along the shorter secondary path has at least the selected intensity, and thus substantially removes the impinged area of the reflective layer, the major portion of the radiation pulse reaching the predetermined region thereafter can continue on through the area of removal toward the selected location.

7. In an apparatus for directing a radiation pulse from a source therein to a selected location therein and preventing undesired earlier radiation from the source having less than a selected intensity from reaching the selected location, the improvement comprising means for directing a major portion of the radiation pulse energy along a main path to a predetermined region and continuing on toward the selected location, reflective surface means comprising a thin reflective layer in the predetermined region to prevent energy impinging thereon from continuing on toward the selected location, means for directing a minor portion of the radiation pulse energy along a secondary path, and means in the secondary path responsive to radiation having at least the selected intensity positioned to receive the minor portion of the radiation pulse and to substantially remove the reflective layer in the predetermined region in response to the selected intensity thereof before the corresponding major portion of the radiation pulse reaches the predetermined region, so that when the minor portion of the radiation pulse energy along the secondary path has at least the selected intensity, and thus causes the reflective layer to be substantially removed, the major portion of the radiation pulse reaching the predetermined region thereafter can continue on through the region toward the selected location.

8. In an apparatus for directing a radiation pulse from a source therein to a selected location therein and preventing undesired earlier radiation from the source having less than a selected intensity from reaching the selected location, the improvement comprising means for directing a major portion of the radiation pulse energy along a longer main path to a predetermined region and continuing on toward the selected location, means for directing a minor portion of the radiation pulse energy along a shorter secondary path to the predetermined region, and reflective surface means in the predetermined region to prevent energy having less than the selected intensity from continuing on toward the selected location, the surface means comprising a thin reflective layer that remains substantially unimpaired until it is subjected to radiation having at least the selected intensity, and then is substantially removed in the area impinged by such radiation, so that when the minor portion of the radiation pulse energy along the shorter secondary path has at least the selected intensity, and thus substantially removes the impinged area of the reflective layer, the major portion of the radiation pulse reaching the predetermined region thereafter can continue on through the area of removal toward the selected location.

9. Apparatus as in claim 8, wherein the reflective surface means is positioned so as to reflect the undesired earlier radiation in a direction that avoids contact with any portion of the apparatus that might be adversely affected by such radiation.

10. Apparatus as in claim 9, wherein the reflective surface means is positioned at an angle of about 2° to 30° from a plane normal to the main path at the predetermined region.

11. Apparatus as in claim 8, wherein the reflective layer comprises essentially aluminum, gold, silver, copper, or lead.

12. Apparatus as in claim 11, wherein the reflective layer is about 100 to 1000 angstroms thick.

13. Apparatus as in claim 12, wherein the reflective layer comprises a coating on a transparent support.

14. Apparatus as in claim 13, wherein the support comprises essentially glass, quartz, polyethylene terephthalate, or other transparent plastic.

15. Apparatus as in claim 14, wherein the support is less than about 10 wavelengths thick.

16. Apparatus as in claim 8, wherein the radiation source is a neodymium laser, and the reflective layer comprises a coating consisting essentially of aluminum about 100 to 1000 angstroms thick on a polyethylene terephthalate support.

17. Apparatus as in claim 16, wherein the selected intensity is about 0.2 to 2 joules per square centimeter.

18. Apparatus as in claim 8, wherein the radiation source comprises a laser that may emit other radiation before a stimulated emission pulse.

19. Apparatus as in claim 8, wherein the means for directing the major and minor portions of the radiation pulse energy comprises a beam splitter.

20. Apparatus as in claim 19, further comprising means for moving the beam splitter to control the ratio of the major portion to the minor portion of the energy.

21. Apparatus as in claim 20, wherein the beam splitter is adjusted to direct about 10 to 40 percent of the energy along the shorter path and the balance along the longer path.

22. Apparatus as in claim 8, comprising at least one reflector in the longer path.

23. Apparatus as in claim 8, comprising also means for adjusting the length of the longer path.

24. Apparatus as in claim 23, wherein the adjusting means comprises a reflector in the longer path and means for controlling its position.

* * * * *